Figure 1:
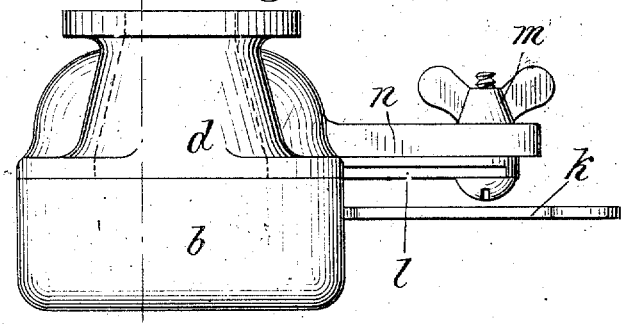

W. H. C. HIGGINS, Jr.

CARBURETER.

APPLICATION FILED JAN. 10, 1910.

Reissued May 3, 1910. 13,111.

Witnesses,
Edward T. Wray,
Minnie M. Lindenau.

Inventor.
William H. C. Higgins Jr.
by [illegible]
Attorneys.

UNITED STATES PATENT OFFICE.

WILLIAM H. C. HIGGINS, JR., OF LAPORTE, INDIANA, ASSIGNOR, BY DIRECT AND MESNE ASSIGNMENTS, TO M. RUMELY COMPANY, OF LAPORTE, INDIANA, A CORPORATION OF INDIANA.

CARBURETER.

13,111. Specification of Reissued Letters Patent. Reissued May 3, 1910.

Original No. 856,638, dated June 11, 1907, Serial No. 326,021. Application for reissue filed January 10, 1910. Serial No. 537,367.

*To all whom it may concern:*

Be it known that I, WILLIAM H. C. HIGGINS, JR., a citizen of the United States, residing at Laporte, in the county of Laporte and State of Indiana, have invented certain new and useful Improvements in Carbureters, of which the following is a specification, reference being had to the accompanying drawings, forming a part thereof.

This invention relates particularly to the devices in which the gaseous mixture of hydrocarbon vapor and air for internal combustion engines is formed and by which the volume and the quality of the mixture supplied are regulated. Devices of this character frequently fail to secure satisfactory mixtures under all conditions. Moreover, the valves in such devices are sometimes actuated by suction and are controlled more or less by spring tension.

It is the object of this invention to enable a satisfactory explosive mixture to be produced under all varying conditions of engine load and speed, to eliminate the uncertainty in action of suction actuated and spring controlled valves by actuating the valves directly by mechanical means, and generally to improve the construction and operation of devices of the character referred to.

More definitely and explicitly stated, the objects of my invention are as follows. My invention is particulary applicable for the use of petroleum and its derivatives heavier than gasolene. Dealing with such heavy hydrocarbons necessitates greater accuracy in the relative proportions of fuel and air than is the case with gasolene and like fuels of less specific gravity. The feed of oil, in order to maintain a proper mixture, must be varied as the supply of air varies; but not so rapidly, and a definite relation between oil and air must be maintained. In my invention, this is done solely by a variation in the vacuum; and hence it is part of the object of my structure to vary the vacuum, but not so rapidly as the variation in the supply of air. For example, as the supply of air is cut down, the vacuum is also reduced, but not so rapidly as the air, and therefore there is a progressively richer mixture as its quantity is diminished, for the supply of oil is diminished, but not so rapidly as the supply of air, in accordance with well-known laws of thermo-dynamics. The means by which I accomplish these objects are as follows. I provide a mixing chamber having a fuel-inlet, a mixture-outlet, and an air-inlet, which consists in the form here illustrated, of two parts or ports which, however, are alike in respect to the pressures on both sides of them, that is, on the mixture chamber side and the air-supply side. These two ports or passageways or openings perform together the function of admitting air to the mixing-chamber; and the effective area of the air-admission means, or of this two-part air passage or port is controlled simultaneously with the mixture-outlet by one and the same apparatus or means,—in this case, by a slide-valve, so as to produce the result with respect to variation of air-supply, vacuum and fuel, above set out as the object of my invention. In the particular form of apparatus here shown, the parts are arranged so as to cause the variation of the effective areas of the air-inlet and mixture-outlet from substantial equality at full load to a relatively wide variation at light load, such variation as to both, being progressive by comparatively small increments.

Another part of my invention has for its object to furnish means for adjusting or varying the effective area of the air-inlet, independent of the variation which is simultaneous with the variation of the mixture-outlet.

While it is theoretically possible to design an engine so that with a given form of carbureter made according to so much of my invention as is above referred to, satisfactory results ought, theoretically, to be obtained for varying loads, in practice this seems so far difficult as to make necessary means for this separate and independent adjustment or variation of the effective area of the air-inlet for each separate engine. The means which in this form of my apparatus I have illustrated for this purpose, consists of a sliding shutter which deals with one part or port or passageway intended for the introduction of the air. This device is also desirable, if not necessary, for adjusting the parts to compensate for variations in the fuel which may be from time to time employed with any particular engine. The two-part air-inlet is, as to the operation of the throttling-valve or valve which works simultaneously to control both inlet and outlet, a single port or passageway shaped so as to secure the result in question. As to the shutter, it is an inlet one part of which only is dealt with thereby. The air-admission passageway or inlet is, therefore, in effect, divided into two parts or ports with respect to the separate adjustment in the particular form of apparatus here shown, while it is a single port or admission means with respect to the general operation of the device. The two parts of the air-admission passageway are separated by a rib which has no function except to serve as a convenient guide for the shutter, but could be dispensed with even for that purpose. The cross-sectional area of the pipe which leads from the mixture-outlet *e* should be such as to make it substantially equal to the cross-sectional area of such outlet.

The invention will be more fully described hereinafter with reference to the accompanying drawings in which, for purposes of illustration and explanation of the nature of the invention it is shown as embodied in a convenient and practical structure.

Figure 2:
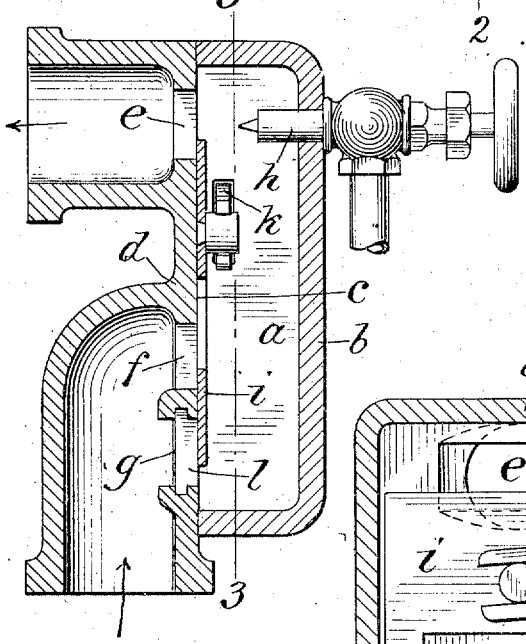
Figure 3:
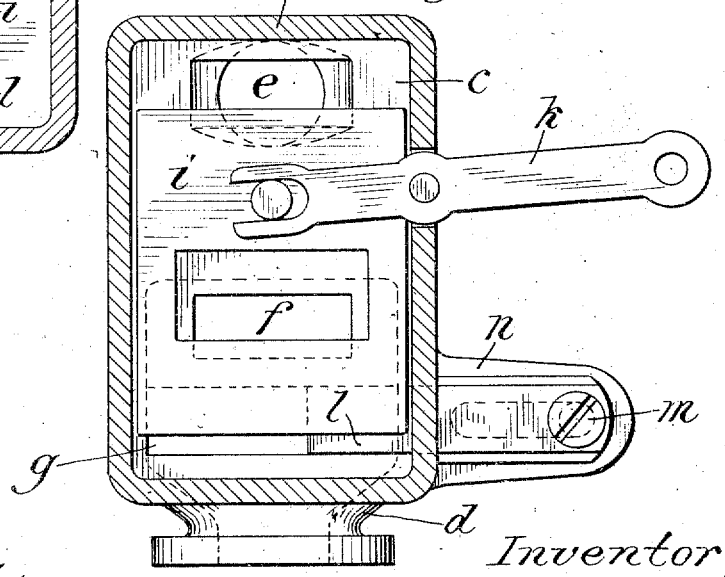

In said drawings Figure 1 is a top view of the improved carbureter, the fuel nozzle being omitted. Fig. 2 is a section on the plane indicated by the line 2—2 of Fig. 1. Fig. 3 is a section on the plane indicated by the line 3—3 of Fig. 2.

In the embodiment of the invention illustrated in the drawings the carbureter chamber *a* is formed by a cap or cover *b* suitably secured to the flat wall *c* of a suitable casting *d*. In the wall *c* are formed three ports, one port *e* being provided for the discharge of the combustible mixture to the engine, and two ports *f* and *g* being provided for the admission of air to the chamber *a* to form the combustible mixture with the hydrocarbon which is admitted through a needle valve *h* of ordinary construction, from a constant-level hydrocarbon reservoir, not shown. Any arrangement which will produce a uniform flow under constant suction conditions is what is required and this, of course, might be accomplished without any valve at all, though the convenient means is some such valve as that shown and described. The ports *e*, *f* and *g* are controlled by valves which move simultaneously, preferably by a plate slide valve *i* which may be actuated by a lever *k*, or other suitable means, from any suitable source of motion, such as the hand of the operator or an engine governor, if one be employed. The valves or valve plate are or is arranged to open the two ports *e* and *f* in like measure or to close them in like measure, but to close the port *g* as the ports *e* and *f* are opened and vice versa. Independent means are provided for regulating the area of the port *g*, said means consisting, in the construction shown, of a shutter *l* arranged to slide longitudinally over the port *g* and to be secured in adjusted position by a thumb nut and bolt *m* coöperating with an ear *n* of the casting *d*.

In explaining the operation of the improved carbureter it will first be assumed that the quantity of fuel vapor derived from the needle valve or other fuel supply nozzle indicated generally at *h* is dependent upon the quantity of hydrocarbon supplied and upon the degree of vacuum in the chamber *a*. The quantity of hydrocarbon supplied is determined in the usual and well known manner by regulation of the valve *h*. The degree of vacuum in the chamber *a*, assuming that the suction of the engine is constant, depends upon the relative area of the discharge port *e* and the air inlet ports *f* and *g*.

If the port *g* is entirely closed by the shutter *l*, so that the movement of the slide valve *i* has no effect on said port, it is obvious that the area of the port *f* for the admission of air will always be proportionate to the area of the port *e* for the delivery of the mixture, port *f* being wide open when the port *e* is wide open and being closed by the movement of the slide valve *i* in the same proportion as the port *e* is closed. When both ports are wide open the engine receives a full charge of air and the valve *h* is then adjusted by hand to admit such a quantity of hydrocarbon as will produce a satisfactory explosive mixture under such conditions, the engine then generating its full power. It will be seen, however, that if through the operation of the lever *k*, by hand or otherwise, when the load is thrown off the engine, the slide valve *i* is shifted to reduce the effective area of the ports *e* and *f* to the same extent, the vacuum in the chamber *a* will remain about the same as at full load whereby, since the supply of hydrocarbon remains constant under these conditions while the volume of air is decreased, the mixture would be too rich. On the other hand, if the shutter *l* is withdrawn so as to leave the port *g* wide open, so that it is then opened by the slide valve *i* in proportion to the closing of the ports *e* and *f* by the same movement, the amount of air admitted to the chamber *a* will depend upon the combined effective areas of the ports *f* and *g*. As indicated in Fig. 3 of the drawings, the port *g* is preferably somewhat longer than ports *e* and *f* although its width is about the same as that of each of the ports *e* and *f*. Furthermore, the shutter *l* is preferably of such length and so adjusted that the port *g* is never closed completely. It will now be understood that when the slide valve *i* is dropped so as to open the ports *e* and *f* wide, it will at the same time close the port *g* completely, establishing the same condition as above described, with the hydrocarbon inlet valve *h* adjusted properly for operating under full load. If, however, the load be thrown off completely the movement of the slide valve *i* will tend to close the ports *e* and *f* and will open the port *g*. But if there be no governor connection the valve may be hand operated. When the port *e* is almost closed, allowing very little mixture to pass to the engine, and port *f* is closed to the same degree while port *g* is nearly wide open, the admission of air to the chamber *a* will be much in excess of the withdrawal and the vacuum in the chamber will therefore be much reduced, or the conditions in the mixing chamber will be such that little or no fuel will be drawn out from the fuel supply pipe. If the fuel inlet valve *h* is set as for operation under full load, as above described, the engine, under these conditions, will get too little fuel because of the low degree of vacuum. The shutter *l* must, therefore, be adjusted between the two extreme points for ordinary running conditions, so as to reduce to the necessary extent the effective area of the port *g* and thus maintain a proper degree of vacuum in the chamber *a*. The adjustment of the shutter *l* may be determined by trial under varying conditions of operation, for example when the openings *e* and *f* are almost closed the shutter *l* is moved so as to reduce the opening *g* until the vacuum is such that a satisfactory mixture is supplied. The partition between what I have called the ports *f* and *g* is, of course, always covered by the valve plate *i* so that the two ports are in effect but one and are spoken of as separate ports rather than as separate parts of the same port for convenience in expression. It is, therefore, the valve *i* and its perforation which results in the provision of two effective air ports, and in using the term "admission ports" I wish to be understood as referring to the two such effective ports produced by the co-operation of the perforated slide valve *i* with the air admission passages *f* and *g*, which latter may or may not be separated by the partition. The idea is that while there are two air ports, so to speak, or two parts of one port, one of which closes as the other opens, it is not necessary that this arrangement should involve two separate air holes in the wall of the mixing chamber. The relative sizes and proportions of the openings *e*, *f* and *g* are not intended to be accurately shown, nor have these proportions been calculated either as concerns their positive dimensions or the effective dimensions illustrated in Fig. 3. The essential point is that there should be a vacuum, and such a vacuum as may from time to time be required in proximity to the nozzle or fuel supply pipe so that fuel will be sucked in the mixing chamber in proper quantities as required and the relative sizes and proportions of the openings will easily be determined by actual experiment or observation of any particular type of engine or as to any particular engine as occasion may require.

It will be understood that the details of construction and arrangement may be varied to suit different conditions of use and that the invention is not restricted to the precise construction or arrangement shown.

In this carbureter, the fuel valve responds to changes in the vacuum in the mixing chamber to vary its feed. The mixture-outlet and the fuel-inlet are manipulated by the valve, so that while their effective areas are substantially equal, as they ought to be at full load, to give such a vacuum as will properly enrich the air passing into the engine, they are of widely differing effective areas as the load is reduced to a minimum, for while the mixture-outlet is steadily reduced until it is nearly closed, the air-inlet, though steadily reduced, is or may be much greater as to its area than the mixture-outlet at minimum load, and might even, under certain conditions, be not very much reduced from its original effective area. This result is brought about by the action of the lever which may be hand-operated or operated from the engine. In this case also there is a variation for adjusting purposes of the air-inlet or a portion of it by means of the shutter which is operable while the engine is not working. As the load is reduced and the amount of air supplied to the engine is diminished, the proportion of oil should be increased, and the vacuum therefore should be reduced as the load varies downwardly from full load, but not so rapidly as the reduction in the supply of air. This is accomplished by such an apparatus as I have illustrated, or any apparatus wherein the variation of the outlet and the air-inlet is such as to leave them widely different at light load when they have been set so as to be substantially the same at high load.

I claim as my invention—

1. A carbureter comprising a mixing chamber provided with a fuel inlet, two air admission ports, and a delivery port, means actuated externally of the carbureter for varying simultaneously the effective area of all of said ports, and independent means also actuated externally of the carbureter for varying the effective area of one of the air admission ports.

2. A carbureter comprising a mixing chamber provided with a fuel inlet, a port for the delivery of the mixture and a plurality of ports for the admission of air, positively actuated means to open and close the delivery port and one of said air ports and positively actuated means to close and open coördinately another of said air ports in opposition, the effective areas of the delivery-port and of the air-admission ports being substantially equal when the delivery-port is fully open and as the delivery port is gradually closed the area of the air-admission ports being always equal to or less than their area when the delivery port is fully open.

3. A carbureter comprising a mixing chamber provided with a fuel inlet, a delivery port for the mixture, and a plurality of air inlet ports, means to open and close the delivery port and one of the inlet ports, means actuating simultaneously therewith, to close and open another of the inlet ports, and means to adjust the effective area of the last named inlet port.

4. A carbureter comprising a mixing chamber provided with a fuel inlet, a port for the delivery of the mixture, and two ports for the inlet of air, and a valve cooperating with said ports to open the delivery port and one of the air ports and simultaneously close the other of the air inlet ports, and vice versa, the effective areas of the delivery-port and of the air-admission ports being substantially equal when the delivery-port is fully open and as the delivery port is gradually closed the area of the air-admission ports being always equal to or less than their area when the delivery port is fully open.

5. A carbureter comprising a mixing chamber provided with a fuel inlet, a port for the delivery of the mixture and two ports for the inlet of air, a valve coöperating with said ports to open the delivery port and one of the air ports and simultaneously close the other of the air inlet ports and vice versa, and means to adjust the effective area of the last named inlet port.

6. A carbureter comprising a mixing-chamber having a fuel-inlet, a port for the delivery of the mixture and an air-inlet, in combination with positively actuated means to simultaneously open and close the delivery-port and a part of the air-inlet and close and open coördinately another portion of the air-inlet in opposition, the effective areas of the delivery port and of the air-admission port being substantially equal when the delivery port is fully open and as the delivery port is gradually closed the area of the air-admission port being always equal to or less than its area when the delivery port is fully open.

7. A carbureter comprising a mixing-chamber having a fuel-inlet, a port for the delivery of the mixture, and an air-inlet, in combination with positively actuated means to simultaneously open and close the delivery port and a part of the air-inlet and close and open coördinately another portion of the air-inlet in opposition, and separate means for separately adjusting the effective area of one such part of the air-inlet.

8. A carbureter comprising a mixing-chamber provided with a fuel-inlet, a port for the delivery of the mixture, a plurality of ports for the admission of air, means positively actuated to open and close the delivery port and one of said air-ports and close and open coördinately another of said air-ports in opposition, the effective areas of the delivery port and of the air-admission port being substantially equal when the delivery port is fully open and as the delivery port is gradually closed the area of the air-admission port being always equal to or less than its area when the delivery port is fully open.

9. In a carbureter, a mixing-chamber having a fuel-inlet adapted to vary its feed responsive to variations in the vacuum in the mixing-chamber, and an air-inlet and a mixture-outlet, in combination with means for simultaneously but unequally varying both of their effective areas during operation, and separate means for adjusting the effective area of one of them during such operation.

10. In a carbureter, a mixing-chamber having a fuel-inlet adapted to vary its feed responsive to variations in the vacuum in the mixing chamber, and an air-inlet and a mixture-outlet, in combination with means adapted to simultaneously but unequally vary their effective areas, the effective areas of the mixture-outlet and air-inlet being substantially equal when the mixture outlet is fully open and as the mixture outlet is gradually closed the area of the air-inlet being always equal to or less than its area when the delivery port is fully open.

11. In a carbureter, a mixing-chamber having a fuel-inlet, a mixture-outlet and an air-inlet, in combination with a valve to simultaneously vary the effective areas of the mixture-outlet and air-inlet, and a second valve to adjust that part of the air-inlet which is closed by the first valve when the carbureter is in operation at full load.

WILLIAM H. C. HIGGINS, JR. [L. S.]

Witnesses:
E. S. TREHLONIUS,
JOS. J. RUMELY.